US010530484B2

United States Patent
Hjartarson et al.

(10) Patent No.: US 10,530,484 B2
(45) Date of Patent: Jan. 7, 2020

(54) INTEGRATED CONTROL LOOP FOR LINEARIZATION AND TEMPERATURE COMPENSATION OF AN ELECTRO-ABSORPTION MODULATOR

(71) Applicant: ElectroPhotonic-IC Inc., Kanata (CA)

(72) Inventors: Gudmundur A. Hjartarson, Ottawa (CA); William A. Hagley, Ottawa (CA)

(73) Assignee: ElectroPhotonic-IC Inc., Kanata (CA)

( * ) Notice: Subject to any disclaimer, the term of this patent is extended or adjusted under 35 U.S.C. 154(b) by 0 days.

(21) Appl. No.: 16/263,169

(22) Filed: Jan. 31, 2019

(65) Prior Publication Data

US 2019/0238234 A1    Aug. 1, 2019

Related U.S. Application Data

(60) Provisional application No. 62/625,311, filed on Feb. 1, 2018.

(51) Int. Cl.
*H04B 10/50* (2013.01)
*H04B 10/588* (2013.01)

(52) U.S. Cl.
CPC . *H04B 10/50593* (2013.01); *H04B 10/50575* (2013.01); *H04B 10/588* (2013.01)

(58) Field of Classification Search
CPC ........ H04B 10/50593; H04B 10/50575; H04B 10/588; G02F 1/0123
See application file for complete search history.

(56) References Cited

U.S. PATENT DOCUMENTS

| | | |
|---|---|---|
| 6,687,466 B1 | 2/2004 | Chiappetta |
| 6,844,954 B2 | 1/2005 | Bond et al. |
| 6,873,801 B1 | 3/2005 | Yamaki et al. |
| 7,340,184 B2 | 3/2008 | Frederiksen et al. |
| 8,269,431 B2 | 9/2012 | Then et al. |

(Continued)

FOREIGN PATENT DOCUMENTS

EP         0600533 A1    6/1994

OTHER PUBLICATIONS

Johan Bauwelinck et. al., Book Chapter 10: "Electronic drivers/TIAs for optical interconnects"; Book title "Optical interconnects for data centers", p. 247-262, Ed. T. Tekin et al., Elsevier Nov. 14, 2016.

*Primary Examiner* — Casey L Kretzer
(74) *Attorney, Agent, or Firm* — Miltons IP/p.i.

(57) ABSTRACT

An integrated high speed electro-optical control loop for very high-speed linearization and temperature compensation of an electro-absorption modulator (EAM) for analog optical data center interconnect applications is disclosed. The control loop can function in a stable manner because the electronics and optical components are monolithically integrated on a single substrate in small form factor. Because of the small size enabled by monolithic integration, the temperatures of the optical blocks and electronics blocks are tightly coupled, and the control loop time delays and phase delays are small enough to be stable, even for very high frequency operation. This arrangement enables a low cost, low power analog transmitter implementation for data center optical interconnect applications using advanced modulation schemes, such as PAM-4 and DP-QPSK.

11 Claims, 2 Drawing Sheets

(56) References Cited

U.S. PATENT DOCUMENTS

2004/0028099 A1* 2/2004 Hongo .................. G02F 1/0123
                                                    372/38.02
2009/0324252 A1* 12/2009 Nagayama ............ G02F 1/0123
                                                    398/183
2013/0084065 A1* 4/2013 Ishii ..................... H04B 10/505
                                                    398/38

* cited by examiner

INTEGRATED CONTROL LOOP FOR LINEARIZATION AND TEMPERATURE COMPENSATION OF AN ELECTRO-ABSORPTION MODULATOR

CROSS-REFERENCE TO RELATED APPLICATIONS

This application claims priority from U.S. provisional patent application No. 62/625,311 filed Feb. 1, 2018, entitled "Integrated Control Loop for Linearization and Temperature Compensation of an Electro-Absorption Modulator", which is incorporated herein by reference in its entirety.

TECHNICAL FIELD

The present invention relates to electro-absorption modulators and particularly to linearization and temperature compensation of electro-absorption modulators for high speed optical data center applications.

BACKGROUND

Electro-absorption modulators (EAM) are commonly used in the fiber optics world. EAMs are used as external modulators of light output from continuous wave lasers. For example, an EAM can be used with an inexpensive slow laser for a high-performance application, i.e. transmitting at data rates limited, not by the characteristics of the laser, but by the characteristics of the EAM.

In most applications of EAMs to date, the modulators and the electronics driving the modulator are separate chips mounted on a substrate and interconnected by a matched impedance strip-line circuit. At the speeds where EAMs are typically used, a matched impedance drive circuit is required, unless the interconnect length is much less than a wavelength. Commonly available packaging approaches do not meet this requirement and matched impedance interconnect is needed. However, use of a matched impedance strip-lines results in significant power loss, i.e. loss of half of the drive voltage due to the matched impedances. For a typical EAM drive voltage is in the order of 2 Volts, and an impedance of 50 Ohms, the drive power is quite high, because of the low impedance. To reduce power loss and improved performance, there is a need for alternative solutions that eliminate the need for matched impedance strip-lines.

Another issue is that EAMs are non-linear, temperature dependent and wavelength dependent. As such, they are normally used in applications where the modulation of the light is simple on-off modulation. Analog modulation schemes for high performance applications, such as optical data center interconnects, use other types of modulators, such as Mach-Zehnder (MZ) modulators. MZ modulators are typically larger, costlier and require a digital signal processor (DSP) or other methods to compensate for their sinusoidal modulation function.

There is a need for electro-absorption modulators with improved linearization and temperature compensation, particularly for applications such as high speed optical data center interconnects.

SUMMARY OF INVENTION

The present invention seeks to eliminate or mitigate one or more of the above-mentioned disadvantages of known devices and systems comprising electro-absorption modulators, or at least provide an alternative.

Aspects of the invention provide electro-photonic integrated circuits comprising an electro-ab sorption modulator having monolithically integrated driver and control electronics comprising fast feedback control loop circuitry for linearization and temperature compensation. The fast feedback control loop circuitry for linearization and temperature compensation comprises a first sensor for detecting a temperature of the electro-absorption modulator and generating a first feedback signal for temperature compensation of the electro-absorption modulator and a second sensor for detecting a signal level indicative of the optical output of the electro-ab sorption modulator and generating a second feedback signal for linearization of the optical output of the electro-absorption modulator.

In one aspect, the electro-photonic integrated circuit comprises a substrate defining a device area, an electro-absorption modulator formed on the device area of the substrate with monolithically integrated driver and control circuitry, the electro-absorption modulator having an optical input for receiving continuous wave optical input, an optical output for outputting a modulated optical output, and first and second electrical terminals for applying a bias voltage for operating the electro-absorption modulator;
an electrical control terminal for receiving an input analog modulation signal which is fed through the control circuitry to a control terminal of a drive transistor of driver circuitry of the electro-absorption modulator;
the control circuitry comprising:
a first sense means for detecting a temperature of the electro-absorption modulator and generating a first feedback signal dependent on the temperature of the electro-absorption modulator and first control loop element for combining the first feedback signal and the input analog modulation signal to provide a temperature compensated modulation signal;
a second sense means for detecting an output level of the electro-absorption modulator and generating a second feedback signal dependent on the output level of the electro-absorption modulator and second control loop element for combining the second feedback signal and the temperature compensated modulation signal to provide a linearized modulation signal.

In exemplary embodiments, the first sense means for detecting a temperature of the electro-absorption modulate comprises an electrical temperature sensor placed in close proximity to the electro-ab sorption modulator and the first control loop element for combining comprises a coupler for adding the first feedback signal, e.g. a temperature dependent offset bias, to the input analog modulation signal to provide the temperature compensated modulation signal.

In one embodiment, the second sense means comprises electrical components for detecting a photocurrent of the electro-ab sorption modulator and generating the second feedback signal. In another embodiment, the second sense means comprises electro-optical components comprising an optical tap, for sampling an optical output of electro-absorption modulator, and a photodetector and a transimpedance amplifier for generating the second feedback signal. For example, the second control loop element for combining the second feedback signal and the temperature compensated modulation signal comprises a differential amplifier. The temperature compensated modulation signal is input to a non-inverting input of the differential amplifier and the second feedback signal is input to an inverting input of the differential amplifier, to generate an error voltage from the difference between the two signals.

For applications such as high speed optical data center interconnects, e.g. 25 G or 56 G and higher, it is critical that the control loop circuitry for linearization and temperature compensation provides sufficiently fast feedback and stable operation. Operation of the control loop using discrete components is not practical for high speed operation. A small die size, in which the optical components and electrical components monolithically integrated and the chip layout is optimized to place the optical and electrical components in close proximity, reduces the lengths of conductive interconnect tracks between components to microns or tens of microns, thereby reducing timing delays and phase delays.

In preferred embodiments, the electro-absorption modulator and the monolithically integrated driver and control circuitry is implemented using III-V semiconductor materials, e.g. comprising InP based optical components and InP based transistors for the fast electronic circuitry.

For small form factor, low cost and relatively short reach applications, such as 400 G data center interconnects, when the control and driving electronics and the electro-absorption modulator are integrated into a sufficiently small area, it is possible to eliminate the matched impedance strip-line drive circuit and the associated power loss. Monolithic integration of the optical modulator and the associated driver and control electronics according to embodiments disclosed herein places the components in close proximity and reduces the length of conductive interconnect tracks, e.g. from millimeters to microns. This approximately 1000:1 reduction track lengths, reduces distances that electrical signals must travel, and dramatically reduces phase and time delays between blocks of components, thus enabling fast feedback control circuitry using all electronic components, or electro-optic components, to be implemented, even at very high speeds. This fast feedback approach can linearize the overall transfer function of the modulator as well as closely monitor the temperature of the modulator and apply the appropriate temperature dependent bias voltage to keep the operating range of the modulator properly centered.

The foregoing and other objects, features, aspects and advantages of the present invention will become more apparent from the following detailed description, taken in conjunction with the accompanying drawings, of preferred embodiments of the invention, which description is by way of example only.

DETAILED DESCRIPTION

Figure 1:
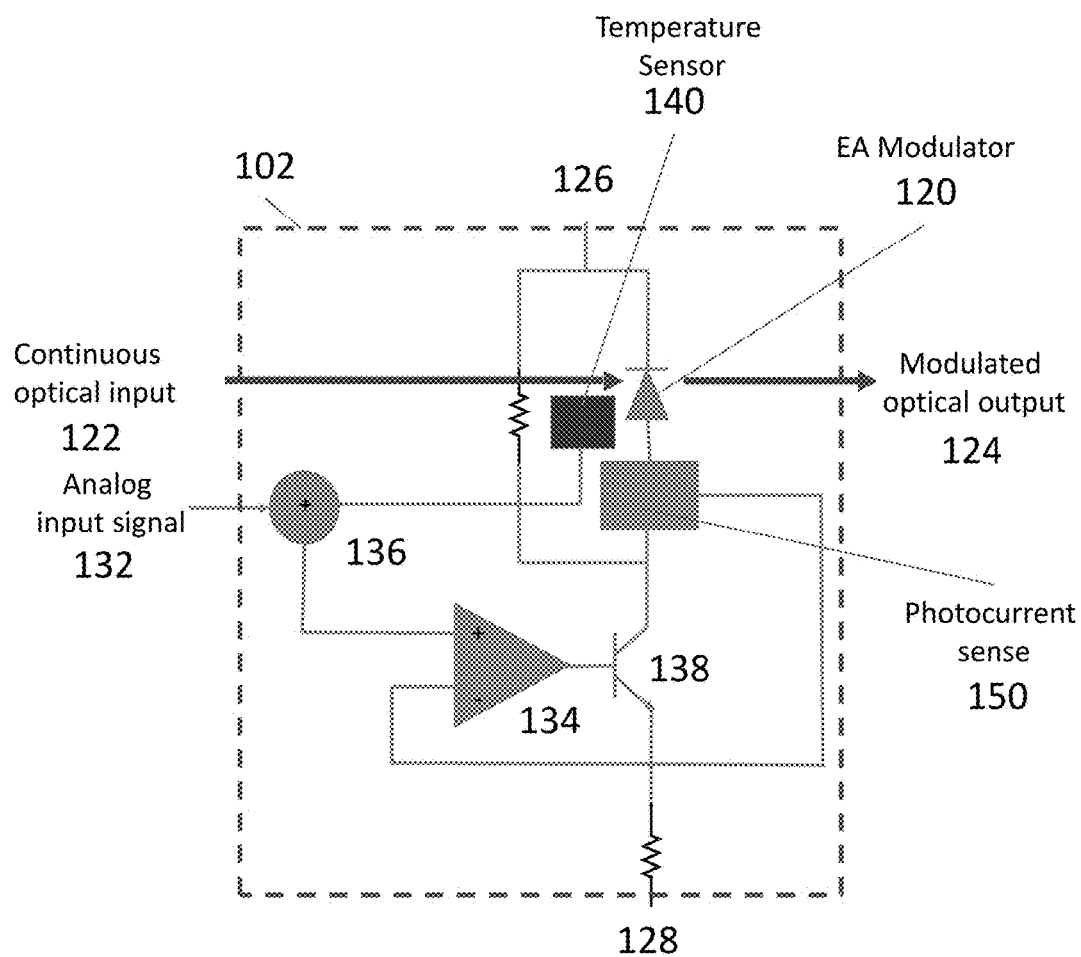
FIG. 1 shows an electro-absorption modulator having monolithically integrated control circuitry for linearization and temperature compensation according to a first embodiment.

An electro-photonic integrated circuit 100 comprising an electro-absorption modulator 120 and monolithically integrated fast feedback control loop circuitry according to a first embodiment, is shown in FIG. 1. Elements of the electro-photonic integrated circuit 100 are monolithically fabricated on a device area 102 of the substrate, and comprise the electro-absorption modulator 120 and integrated driver and control circuitry elements. The electro-ab sorption modulator 120 has an optical input 122 for receiving continuous wave (CW) optical input and an optical output 124 for outputting a modulated optical output. For example, the CW optical input may be provided by a discrete or integrated laser diode (not illustrated) that is coupled to the electro-absorption modulator via an optical waveguide and/ or a spot size converter (SSC). The optical output 124 may also comprise a SSC for coupling to other optical components. Electrical terminals 126 and 128 of the electro-optical modulator are provided for applying a reverse DC bias for operation of the electro-absorption modulator 120. An input modulation signal, i.e. an analog electrical signal, provided at control input 132, and fed through elements of the control circuitry to the control terminal drive transistor 138 of the driver circuitry of the electro-absorption modulator 120 for modulation of the optical output signal. The integrated driver and control circuitry forms a fast feedback control loop, comprising a first sense means with a first control loop element, with, for temperature compensation and a second sense means with a second control loop element, for linearization of the electro-ab sorption modulator.

The first sense means operates to detect a temperature of the electro-absorption modulator and generate a first feedback signal dependent on the temperature of the electro-absorption modulator, and a first control loop element operates to combine the first feedback signal and the input analog modulation signal to provide a temperature compensated modulation signal. The first sense means comprises an electrical sensor 140 for detecting a temperature of the electro-absorption modulator and generating a temperature dependent bias voltage. The temperature dependent bias voltage is fed to control circuit element 136 where it is combined with the input modulation signal to generate a temperature compensated modulation signal. The temperature sensor generates a DC bias which is dependent on the temperature of the modulator, and which is applied to adjust the analog input signal to compensate for temperature changes.

Preferably, the electrical temperature sensor placed in close proximity to the electro-absorption modulator and the first control loop element for combining comprises a coupler 136 for adding the first feedback signal, e.g. a temperature dependent bias voltage, to the input analog modulation signal to provide a temperature compensated modulation signal.

The second sense means comprises electrical circuitry 150 for detecting the output level of the electro-absorption modulator, e.g. an electrical photocurrent sense element for detecting the absorbed photocurrent of the electro-absorption modulator and generating the second feedback signal, dependent on the output level of the electro-ab sorption modulator. The second control loop element comprises a differential amplifier 134 for combining the second feedback signal and the temperature compensated modulation signal to provide a linearized modulation signal. That is, the temperature compensated modulation signal is input to a non-inverting input of the differential amplifier and the second feedback signal is input to an inverting input of the differential amplifier, to generate an error voltage from the difference between the two signals. Thus, the fast feedback control circuitry measures the output optical signal and compares that to the electrical input signal driving the block. The error voltage is generated from the difference between the two signals and is fed to the driver.

Figure 2:
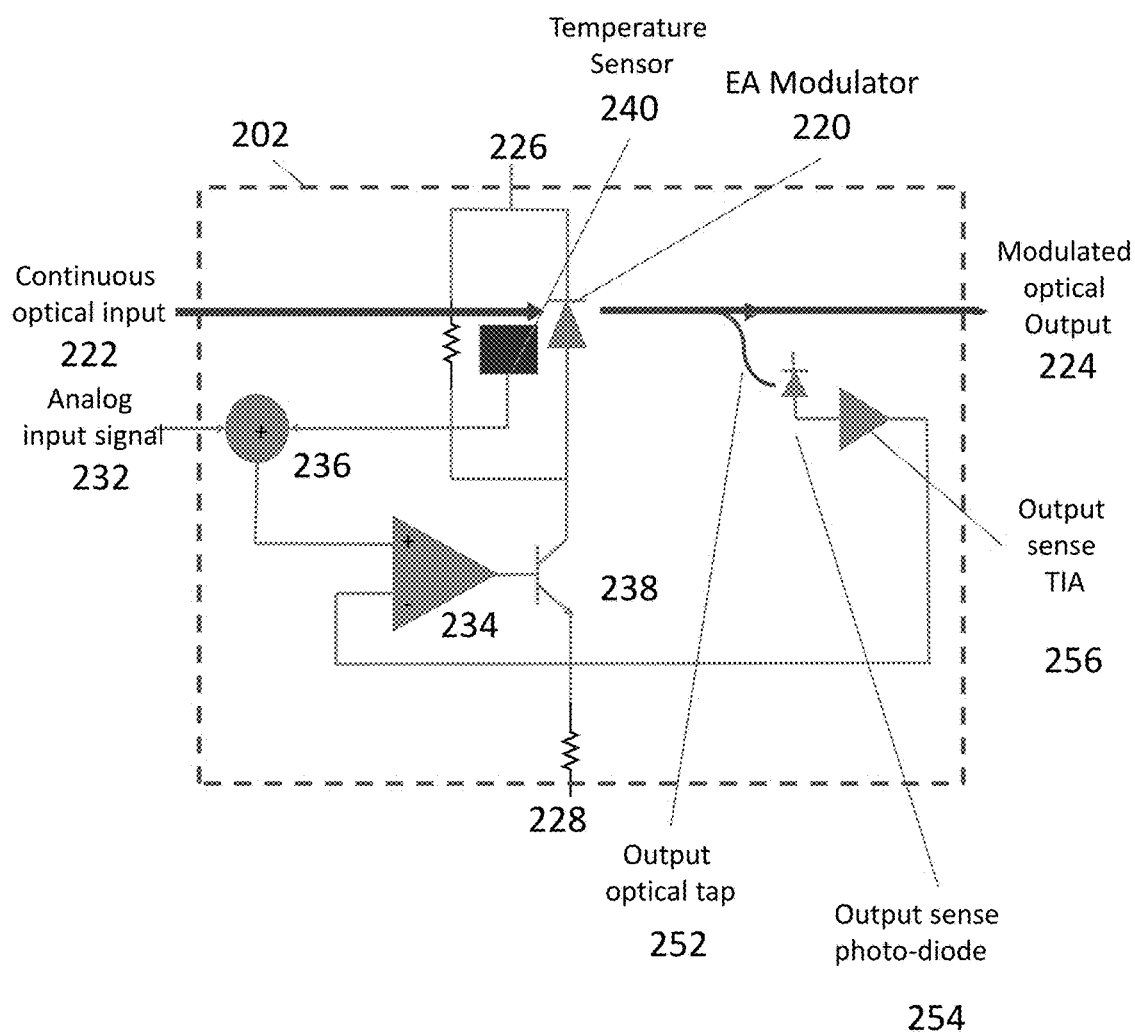
FIG. 2 shows an electro-absorption modulator having monolithically integrated control circuitry for linearization and temperature compensation according to a second embodiment.

An electro-optic integrated circuit 200 comprising an electro-optic modulator 220 having monolithically integrated driver and control electronics comprising a fast feedback circuit for linearization and temperature compensation, according to a second embodiment, is shown in FIG. 2. Many elements of the circuit 200 are similar to those of the circuit 100 of the first embodiment and are labelled with the same reference numerals incremented by 100. Temperature sensor 140 provides for temperature compensation as described for circuit 100 shown in FIG. 1. The fast feedback circuitry shown in FIG. 2 differs from that shown in FIG. 1 in that it comprises electro-optic circuitry for measuring the output optical signal level. That is, the fast feedback circuitry comprises optical tap 252, output sense photo-diode 254 and output sense transimpedance amplifier (TIA) 256 to measure the output optical signal and provide the second feedback signal to the differential amplifier 234. That is, as in the electro-absorption modulator of the first embodiment, the temperature compensated modulation signal is input to a non-inverting input of the differential amplifier and the second feedback signal is input to an inverting input of the differential amplifier, to generate an error voltage from the difference between the two signals which is fed to the driver.

The two embodiments described above differ in the way the feedback measurement of output light is done. The first embodiment shown in FIG. 1 uses the absorbed photocurrent to measure the output level. The second embodiment shown in FIG. 2 taps off a small amount of the output optical signal, and detects it using a high-speed photo detector and a TIA. In each case, the feedback circuit measures the output optical signal and compares that to the electrical input signal driving the block. The error voltage is generated from the difference between the two signals and is fed to the driver. In both implementations, a temperature sensor is placed in close proximity to the modulator. In this way a DC bias is generated that sets the bias dependent on the temperature of the modulator.

For small form factor, low cost and relatively short reach applications, such as 400 G data center interconnects, when the driving electronics and the EAM are integrated into a sufficiently small device area, it is possible to eliminate the matched impedance strip-line drive circuit and the associated power loss. Monolithic integration of the optical modulator and the associated driver and control electronics places the components in closer proximity and significantly reduces the lengths of conductive interconnect tracks, e.g. from millimeters to microns. This approximate 1000:1 reduction in distances that electrical signals must travel, dramatically reduces phase and time delays between blocks thus enabling a fast feedback circuit of either electronic or electro-optic form to be implemented, even at very high speeds. The feedback approach can linearize the overall transfer function of the modulator as well as closely monitor the temperature of the modulator and apply the appropriate temperature dependent bias voltage to keep the operating range of the modulator properly centered.

The monolithic integration reduces the scale of interconnect to microns and this fact, combined with very high-speed transistors, a drive circuit can be implemented that uses feedback to linearize the electro-optical transfer function of the modulator within a limited range of input electrical signals and input optical signals. When operating within this range, the input Continuous Wave (CW) light signal can be linearly modulated allowing advanced modulation schemes, such as QPSK (Quadrature Phase Shift Keying), PAM-4 (4-level Pulse Amplitude Modulation) or even QAM (Quadrature Amplitude Modulation), to be applied to the optical signal. For limited reach applications, such as data center interconnect where the path losses and impairments due to dispersion are limited, complex analog modulation of the light signal can be implemented effectively within a limited dynamic range, while providing good error rate performance across the link. This allows a significant reduction in complexity, cost and power of the link by using simpler building blocks such as an EA modulator and its associated integrated analog electronics, to replace more complex assemblies of Mach-Zehnder modulators, strip line packaging and DSPs to implement the transmitter.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. An electro-photonic integrated circuit comprising:
   a substrate defining a device area;
   an electro-absorption modulator formed on the device area of the substrate with monolithically integrated driver and control circuitry;
   the electro-absorption modulator having an optical input for receiving continuous wave optical input, an optical output for outputting a modulated optical output, and first and second electrical terminals for applying a bias voltage for operating the electro-absorption modulator;
   an electrical control terminal for receiving an input analog modulation signal which is fed through the control circuitry to a drive transistor of driver circuitry of the electro-absorption modulator;
   the control circuitry comprising:
   a first sense means for detecting a temperature of the electro-absorption modulator and generating a first feedback signal dependent on the temperature of the electro-absorption modulator and first control loop element for combining the first feedback signal and the input analog modulation signal to provide a temperature compensated modulation signal;
   a second sense means for detecting an output level of the electro-absorption modulator and generating a second feedback signal dependent on the output level of the electro-absorption modulator and a second control loop element for combining the second feedback signal and the temperature compensated modulation signal to provide a linearized modulation signal.

2. The electro-photonic integrated circuit of claim 1, wherein the first sense means for detecting a temperature of the electro-absorption modulator comprises an electrical temperature sensor placed in close proximity to the electro-absorption modulator and the first control loop element for combining comprises a coupler for adding the first feedback signal to the input analog modulation signal to provide a temperature compensated modulation signal.

3. The electro-photonic integrated circuit of claim 2, wherein the first feedback signal comprises a temperature dependent offset bias.

4. The electro-photonic integrated circuit of claim 2, wherein the first feedback signal is a temperature dependent offset bias.

5. The electro-photonic integrated circuit of claim 1, wherein the second sense means comprises electrical components for detecting a photocurrent of the electro-absorption modulator and generating the second feedback signal.

6. The electro-photonic integrated circuit of claim 1, wherein the second sense means comprises electro-optical components comprising an optical tap, for sampling an optical output of electro-absorption modulator, a photodetector and a transimpedance amplifier to generating the second feedback signal.

7. The electro-photonic integrated circuit of claim 1, wherein the second control loop element for combining the second feedback signal and the temperature compensated modulation signal comprises a differential amplifier, and the temperature compensated modulation signal is input to a non-inverting input of the differential amplifier and the second feedback signal is input to an inverting input of the differential amplifier, to generate an error voltage from the difference between the two signals, which is fed to the driver.

8. The electro-photonic integrated circuit of claim 1, wherein optical components and electrical components are monolithically integrated to place the optical and electrical components in close proximity, wherein the lengths of electrically conductive interconnect tracks between components are in the range of microns to tens of microns, thereby reducing timing delays and phase delays.

9. The electro-photonic integrated circuit of claim 1, wherein optical components and electrical components are monolithically integrated with a chip layout optimized to place the optical and electrical components in close proximity, wherein the lengths of electrically conductive interconnect tracks between components are in the range of microns to tens of microns, thereby reducing timing delays and phase delays.

10. The electro-photonic integrated circuit of claim 1, wherein the electro-absorption modulator and the monolithically integrated driver and control circuitry are implemented using III-V semiconductor materials.

11. The electro-photonic integrated circuit of claim 1, wherein the electro-absorption modulator and the monolithically integrated driver and control circuitry comprise Indium Phosphide (InP) based optical components and InP based transistors for electronic circuitry.

* * * * *